Oct. 8, 1935.  Z. M. DE ANDRÉS  2,016,629
ARRANGEMENT FOR TRANSFERRING TRUCKS
Filed Oct. 8, 1932   3 Sheets-Sheet 1
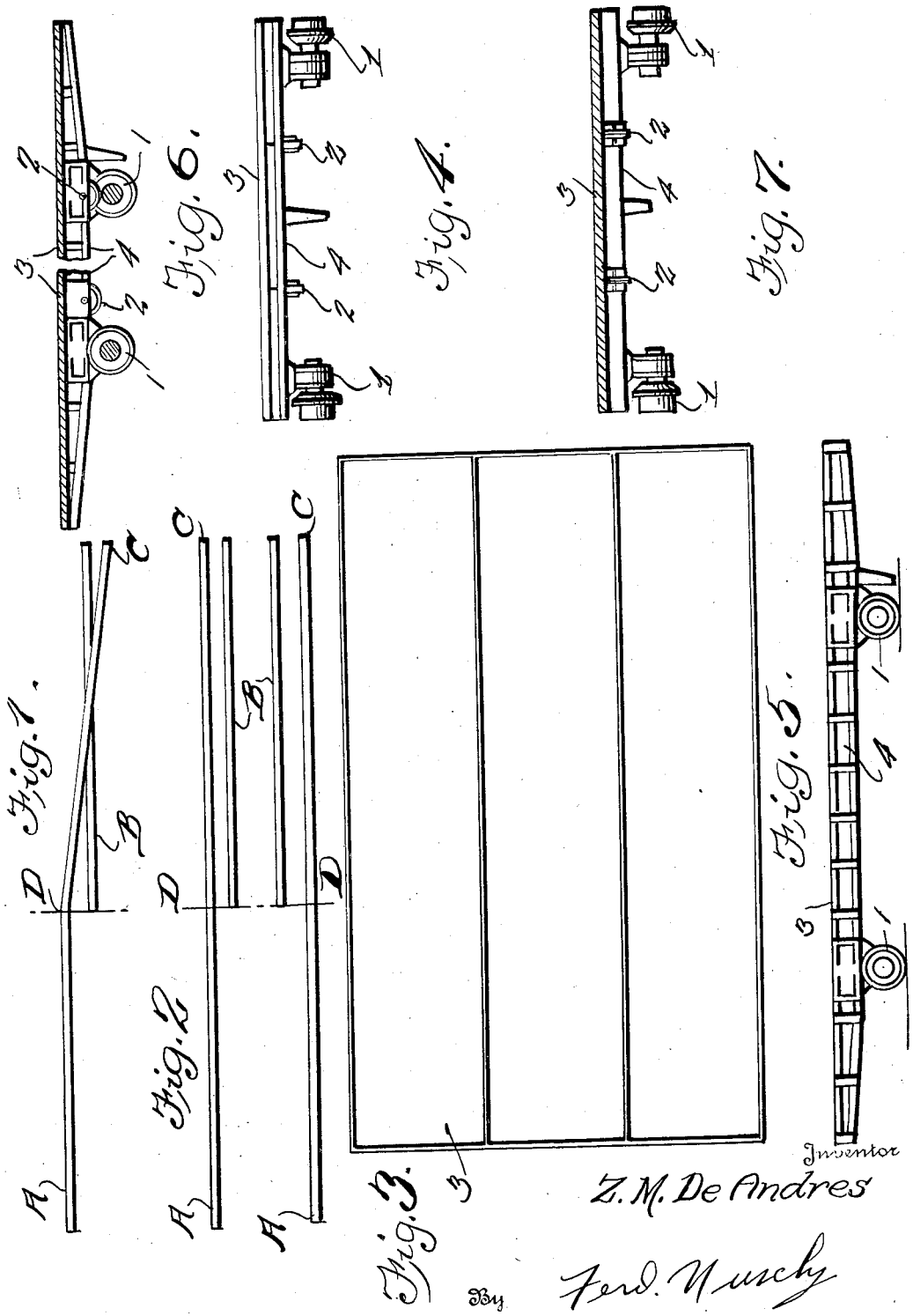

Oct. 8, 1935.     Z. M. DE ANDRÉS     2,016,629
ARRANGEMENT FOR TRANSFERRING TRUCKS
Filed Oct. 8, 1932     3 Sheets-Sheet 2
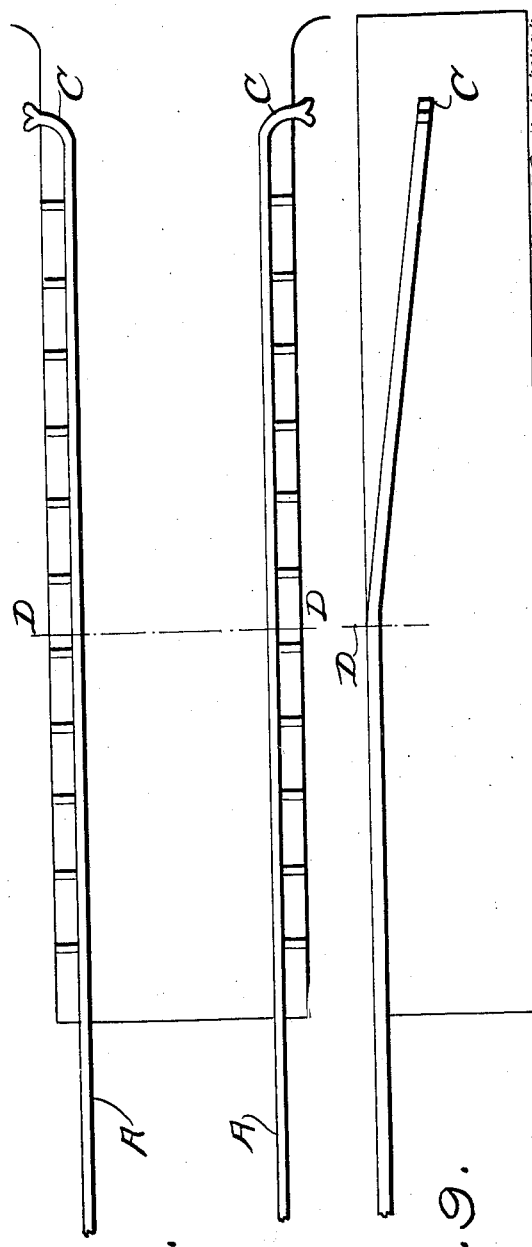
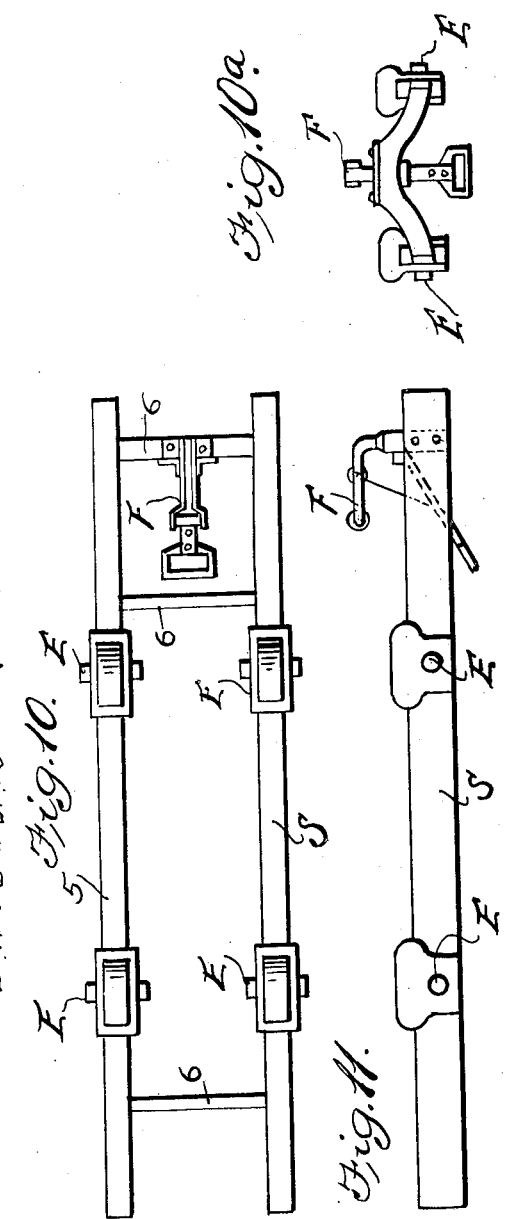

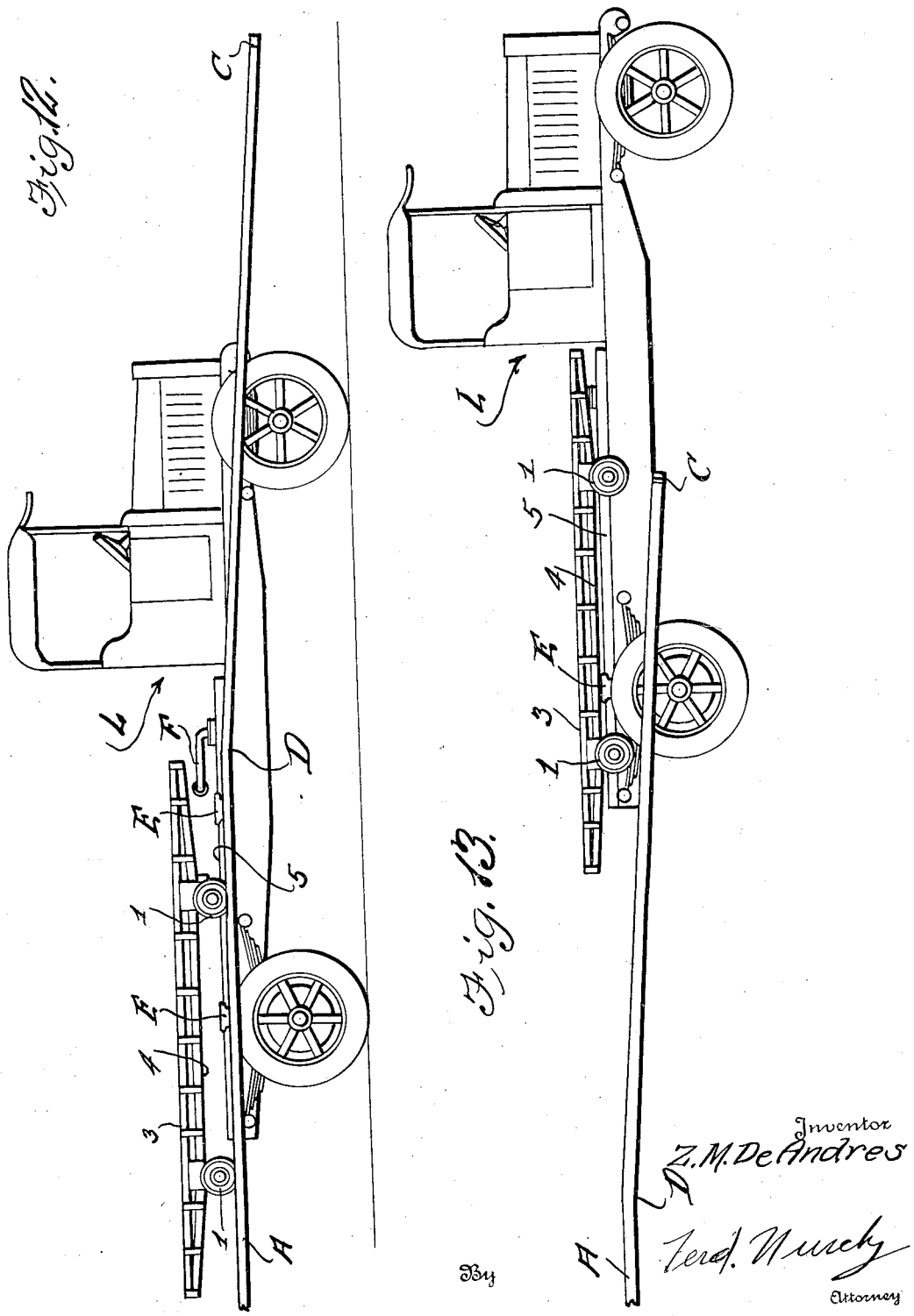

Patented Oct. 8, 1935

2,016,629

UNITED STATES PATENT OFFICE 2,016,629

ARRANGEMENT FOR TRANSFERRING TRUCKS

Zacarias Macias de Andrés, Madrid, Spain

Application October 8, 1932, Serial No. 636,958

1 Claim. (Cl. 214—38)

This invention relates to an arrangement for transferring trucks provided with two sets of wheels from a narrow gauge to wide gauge track and inversely, and for loading and unloading such a truck on to a transporting vehicle carrying a rail track.

This is attained according to the invention by providing a ramp at the end of one gauge track intersecting the plane of the other gauge track, so that trucks running on one set of wheels on approaching the ramp on one track will engage the ramp with their other set of wheels and thus automatically pass onto the other gauge track. The upper gauge track may lead on to a transporting vehicle, so that the truck can be easily loaded onto and unloaded from the transporting vehicles.

Several embodiments of the invention are illustrated by way of example in the accompanying drawings in which:—

Fig. 1 shows the transferring arrangement in side elevation.

Fig. 2 is a top plan view of Fig. 1.

Fig. 3 shows in top plan view a truck adapted to run on two tracks of different gauges.

Fig. 4 is an end view of Fig. 3.

Fig. 5 is a side elevation of Fig. 3.

Fig. 6 is a longitudinal section of Fig. 3.

Fig. 7 is a cross section of Fig. 3.

Fig. 8 shows in top plan view a ramp track for loading a truck onto a transporting vehicle and unloading the same therefrom.

Fig. 9 is a side elevation of Fig. 8.

Fig. 10 shows in top plan view a frame for supporting the truck on the transporting vehicle.

Fig. 10a is an end view of Fig. 10.

Fig. 11 is a side elevation of Fig. 10.

Fig. 12 shows in side elevation a transporting vehicle partly under the truck.

Fig. 13 shows the transporting vehicle with the truck resting thereon.

In the transferring arrangement shown in Figs. 1 and 2 a wide gauge track A, A terminates in a ramp D—C extending below the level of a narrow gauge track B, B.

A truck suitable for this transferring arrangement comprises a body 3 mounted on a chassis 4 provided with two sets of wheels 1, 1 and 2, 2.

If the truck is running with its wheels 1, 1 on the wide gauge track A, A it will descend the ramp D—C until its wheels 2, 2 arrive on the narrow gauge track B, B on which the truck can continue its travel. If the truck approaches the transferring arrangement on the narrow gauge track B, B its wheels 1, 1 will encounter the ramp C—D and cause the truck to rise onto the wide gauge track A, A on which it can continue its travel.

Figs. 8 and 9 show a wide gauge track A, A terminating in a downward ramp D—C intended for transferring the truck onto a transporting vehicle or from a transporting vehicle onto the track A, A. For the purpose of transferring the truck from the track A, A on to a vehicle, for example a lorry as shown in Figs. 12 and 13, the lorry is backed between rails of the ramp D—C extending from the track A, A. On the body of the lorry a frame is arranged composed of two rails 5 connected by the bars 6. The rails 5 form a narrow gauge track so that if the truck is pushed on to the ramp it will descend thereon until its set of wheels 2 run onto the rails 5 and the truck is transferred from the track A, A on to the frame on the lorry. Supports E are provided in the rails 5 of the frame which secure the truck against shifting. A hauling device F is likewise provided on one of the tie bars 6 of the frame for facilitating the shifting of the truck from the track on to the lorry. To facilitate the backing of the lorry between the ends of the ramp these are bent outwards at their extremities C.

For transferring the truck from the lorry onto the track A, A it is merely necessary to back the lorry carrying the truck between the rails of the ramp C—D. The set of wheels 1 will then run onto the ramp and gradually lift the truck off the lorry until it rests on the track A, A.

What I claim is:

An arrangement for transferring trucks between rail track and a motor lorry, comprising in combination with a rail track terminating in a downwardly inclined ramp, a truck, sets of large wheels projecting laterally from said truck adapted to run on said rail track, sets of small wheels intermediate of a gauge less than said sets of large wheels, a motor lorry body of a width less than the gauge of said track adapted to be backed between the ends of said track forming the ramp, and two parallel rails arranged longitudinally on said motor lorry body and adapted to engage said sets of small wheels and lift said truck off said rail track and support the same on said body when said truck is run down said ramp, the small wheels being in a plane above the large wheels to facilitate positioning of the motor lorry body beneath the truck, said large wheels projecting laterally from said body when said truck is supported on said parallel rails.

ZACARIAS MACIAS DE ANDRÉS.